United States Patent
Rasor et al.

(10) Patent No.: US 9,906,462 B2
(45) Date of Patent: *Feb. 27, 2018

(54) INDICATING A SENDING BUFFER AND RECEIVING BUFFER IN A MESSAGE TO USE TO VALIDATE THE MESSAGE IN THE RECEIVING BUFFER

(71) Applicant: INTERNATIONAL BUSINESS MACHINES CORPORATION, Armonk, NY (US)

(72) Inventors: Louis A. Rasor, Tucson, AZ (US); Juan J. Ruiz, Daly City, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/422,283

(22) Filed: Feb. 1, 2017

(65) Prior Publication Data
US 2017/0149684 A1 May 25, 2017

Related U.S. Application Data

(63) Continuation of application No. 14/940,044, filed on Nov. 12, 2015, now Pat. No. 9,606,959.

(51) Int. Cl.
*H04L 12/925* (2013.01)
*H04L 29/08* (2006.01)
*H04L 5/00* (2006.01)

(52) U.S. Cl.
CPC .......... *H04L 47/722* (2013.01); *H04L 5/0053* (2013.01); *H04L 67/10* (2013.01)

(58) Field of Classification Search
CPC .............. G06F 2213/0058; G06F 2213/3808
See application file for complete search history.

(56) References Cited

U.S. PATENT DOCUMENTS

| | | | |
|---|---|---|---|
| 6,310,884 B1 * | 10/2001 | Odenwald, Jr. | H04L 47/33 370/412 |
| 6,449,656 B1 | 9/2002 | Elzur et al. | |

(Continued)

OTHER PUBLICATIONS

U.S. Appl. No. 14/940,044, filed Nov. 2, 2015, (18.607).

(Continued)

*Primary Examiner* — Joe Chacko
(74) *Attorney, Agent, or Firm* — David W. Victor; Konrad Raynes Davda & Victor LLP (57) ABSTRACT

Provided are a computer program product, system, and method for indicating a sending buffer and receiving buffer in a message to use to validate the message in the receiving buffer. A receiving node includes a receive buffer for each of a plurality of external adaptors in external nodes. The receive buffers store messages from the external adaptors. Each of the messages includes an indicated receiving adaptor to receive the message and an indicated sending adaptor that sends the message. A determination is made as to whether the sending adaptor that sent the message comprises the indicated sending adaptor and that a receiving adaptor that received the message comprises the indicated receiving adaptor. An error is indicated for the message in response to determining that at least one of the sending and receiving adaptors that sent and received the message, respectively do not comprise the indicated sending and receiving adaptors, respectively.

15 Claims, 4 Drawing Sheets

(56) References Cited

U.S. PATENT DOCUMENTS

| | | | |
|---|---|---|---|
| 7,027,437 | B1 | 4/2006 | Merchant et al. |
| 7,158,964 | B2 | 1/2007 | Wolrich et al. |
| 9,069,633 | B2* | 6/2015 | Manula ................... G06F 9/546 |
| 2002/0172195 | A1 | 11/2002 | Pekkala et al. |
| 2005/0185609 | A1* | 8/2005 | Malkamaki ........... H04L 1/1809 370/328 |
| 2005/0198531 | A1* | 9/2005 | Kaniz ................... H04L 63/164 726/5 |
| 2006/0004904 | A1 | 1/2006 | Sarangam et al. |
| 2006/0274789 | A1 | 12/2006 | Pong |
| 2013/0315054 | A1 | 11/2013 | Shamis et al. |
| 2014/0112145 | A1 | 4/2014 | Chou et al. |
| 2014/0137215 | A1 | 5/2014 | Hummel et al. |
| 2014/0181241 | A1* | 6/2014 | Manula ............... H04L 67/1097 709/217 |
| 2014/0269378 | A1* | 9/2014 | Holbrook ................ H04L 47/30 370/252 |
| 2015/0365338 | A1 | 12/2015 | Pannell |

OTHER PUBLICATIONS

Office Action dated Feb. 17, 2016, pp. 26, for U.S. Appl. No. 14/940,044, filed Nov. 2, 2015, (18.607).
Response dated Apr. 20, 2016, pp. 13, for U.S. Appl. No. 14/940,044, filed Nov. 2, 2015, (18.607).
Final Office Action dated Aug. 12, 2016, pp. 22, for U.S. Appl. No. 14/940,044, filed Nov. 2, 2015, (18.607).
Response dated Oct. 11, 2016, pp. 5, for U.S. Appl. No. 14/940,044, filed Nov. 2, 2015, (18.607).
Notice of Allowance dated Nov. 16, 2016, pp. 13, for U.S. Appl. No. 14/940,044, filed Nov. 2, 2015, (18.607).
List of IBM Patents or Patent Applications Treated as Related, dated Feb. 1, 2017, pp. 2.

* cited by examiner

INDICATING A SENDING BUFFER AND RECEIVING BUFFER IN A MESSAGE TO USE TO VALIDATE THE MESSAGE IN THE RECEIVING BUFFER

BACKGROUND OF THE INVENTION

1. Field of the Invention

The present invention relates to a computer program product, system, and method for indicating a sending buffer and receiving buffer in a message to use to validate the message in the receiving buffer.

2. Description of the Related Art

Nodes in a network comprised of numerous processors may send messages to each other. Each of the nodes maintains a shared memory in which messages are added by one of the many processors before being sent. A node may have a separate receive buffer for each external adaptor in each of the external nodes in a network. When a processor in a node is ready to send a message, it adds the message to a sending buffer and sends the message from the sending buffer to the remote node to store at the buffer index entry the processor previously obtained for the message The sending adaptor sends a message directly to the receive buffer for that sending adaptor in the receiving node. When a message is received in a receive buffer at a receiving node, the message payload may be validated with a checksum included in the message to determine whether the message is valid.

There is a need in the art for improved techniques for validating messages in the receive buffers at a node receiving the message

SUMMARY

Provided are a computer program product, system, and method for indicating a sending buffer and receiving buffer in a message to use to validate the message in the receiving buffer. A receiving node includes a receive buffer for each of a plurality of external adaptors in external nodes, wherein the receiving node communicates with the external nodes over the network. The receive buffers store messages from the external adaptors, wherein each of the messages includes an indicated receiving adaptor to receive the message and an indicated sending adaptor that sends the message. A determination is made as to whether the sending adaptor that sent the message in one of the receive buffers comprises the indicated sending adaptor and that a receiving adaptor in the receiving node that received the message comprises the indicated receiving adaptor. An error is indicated for the message in response to determining that at least one of the sending and receiving adaptors that sent and received the message, respectively, do not comprise the indicated sending and receiving adaptors, respectively.

DETAILED DESCRIPTION

If a message lands in a receive buffer for which it was not intended, such as a receive buffer not associated with the sending adaptor that sent a message or in an index entry different from that intended for the message, then errors may occur because the message may not be processed as intended and processes waiting for the message may timeout. Further, writing the message to the wrong receive buffer and/or index entry may overwrite another message stored and intended for that receive buffer index entry. The system may not be able to determine the cause for such errors because it may not be able to determine the receive buffer or index entry in which the message should have been stored, or the sending and receive adaptors intended for the message.

Described embodiments provide techniques to determine whether a message is stored in the receive buffer for which it is intended. A receiving node receiving the message has a receive buffer for each of external adaptors comprising the adaptors in external nodes. The receive buffers store messages from the external nodes, wherein each of the messages includes an indicated receiving adaptor to receive the message and an indicated sending adaptor that sends the messages. A determination is made as to whether the sending adaptor that sent the message in one of the receive buffers comprises the indicated sending adaptor and that the receiving adaptor in the receiving node that received the message at the receiving node comprises the indicated receiving adaptor. An error is indicated for the message in response to determining that the sending and receiving adaptors that sent and received the message, respectively do not both comprise the indicated sending and receiving adaptors in the message, respectively.

Figure 1:
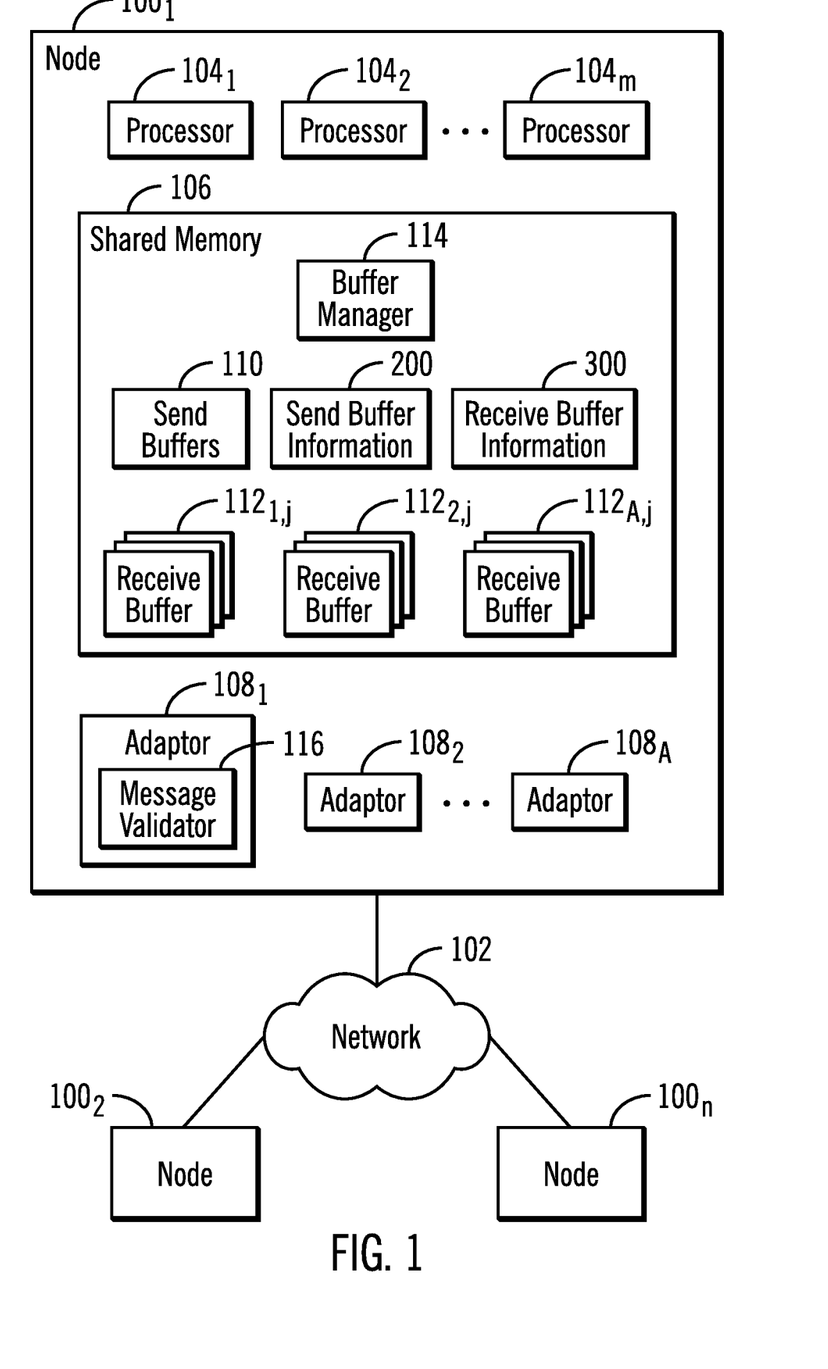
FIG. 1 illustrates an embodiment of a network node messaging environment.

FIG. 1 illustrates an embodiment of a network computing environment having a plurality of processing nodes $100_1$, $100_2 \ldots 100_n$ that communicate over a network 102. Each of the nodes $100_1$, $100_2 \ldots 100_n$ may include the components shown with respect to node $100_1$, including a plurality of processors $104_1$, $104_2 \ldots 104_m$, a shared memory 106 accessible to all the processors $104_1$, $104_2 \ldots 104_m$, and a plurality of network adaptors $108_1$, $108_2 \ldots 108_A$ to provide different connections to the network 102. In certain embodiments, the nodes $100_1$, $100_2 \ldots 100_n$ may have a couple hundred or more processors as well as numerous adaptors.

The shared memory 106 includes a buffer manager 114 that manages send buffers 110 maintained to buffer messages the processors $104_1$, $104_2 \ldots 104_m$, are sending to receiving nodes comprising the other nodes $100_1$, $100_2 \ldots 100_n$. The shared memory 106 further includes a set of receive buffers $112_{1,1} \ldots 112_{1,b}$, $112_{2,1} \ldots 112_{2,b}$, and $112_{A,1} \ldots 112_{A,b}$, one set for each of the adaptors $108_1$, $108_2 \ldots 108_A$ that buffer messages sent from adaptors in the other nodes $102_2 \ldots 102_n$ to process. In certain embodiments, there are b receive buffers for each of the adaptors $108_1$, $108_2 \ldots 108_A$, where b is the number of all the adaptors in the external nodes, so that each adaptor $108_i$ has one receive buffer $112_{i,j}$ for each of the b adaptors in the external nodes.

Each of the send buffers 110 corresponds to one receive buffer and adaptor on another node $100_2 \ldots 100_n$, and has a same number of corresponding buffer entries as those in the corresponding receive buffer at the other node. Buffers 110, $112_{i,j}$ may each have hundreds of entries. A node $100_i$ maintains one send buffer 110 for each receive buffer/adaptor pair on another of the nodes $100_1$, $100_2 \ldots 100_n$ to which messages are sent. Thus, for each pair of nodes $100_i$ and $100_j$, there is pair of send and receive buffers for each adaptor on the receiving node, such that the nodes $100_i$ and $100_j$ have a send buffer $110_i$, $110_j$ in which to build messages being sent to a corresponding receive buffer for an adaptor at the remote node $100_j$, $100_i$. Each of the processors $104_1$, $104_2 \ldots 104_m$ include a send message routine that is executed to send a message to a remote node $100_1$, $100_2 \ldots 100_n$.

Each of the adaptors $108_1, 108_2 \ldots 108_A$ has a message validator routine 116 to validate messages in the receive buffers $112_{1,1} \ldots 112_{1,b}, 112_{2,1} \ldots 112_{2,b},$ and $112_{A,1} \ldots 112_{A,b}$ for the corresponding adaptors $108_1, 108_2 \ldots 108_A$, respectively.

Figure 2:
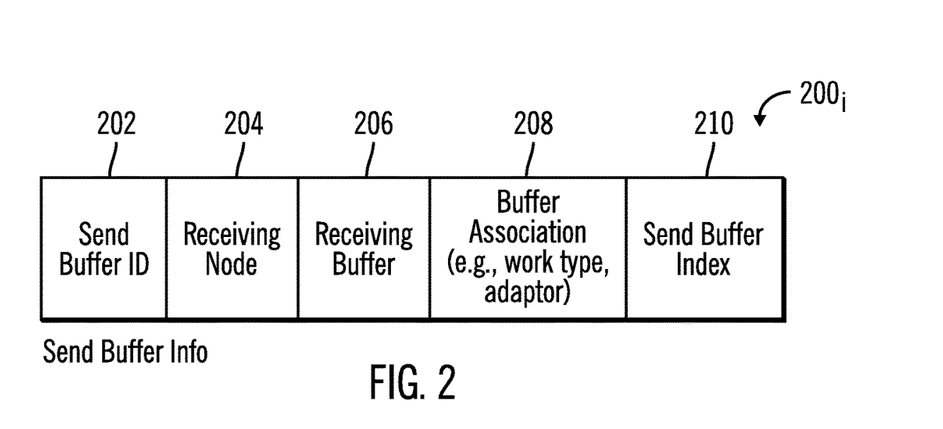
FIG. 2 illustrates an embodiment of send buffer information for each send buffer at a node.

The buffer manager 114 maintains send buffer information 200 having information on the send buffers 110. There may be an index entries for each send buffer 110 used to send messages to one remote node $100_1, 100_2 \ldots 100_n$. The send buffer 110 for one receive buffer on another of the nodes $100_1, 100_2 \ldots 100_n$, has a same number of entries as the corresponding receiving buffer on the external node. There may be one or more receive 112 and send 110 buffer pairs for each pair of nodes. In one embodiment, there may be a pair of send and receive buffers for each adaptor on the receiving node with which the sending node may communicate.

Figure 3:
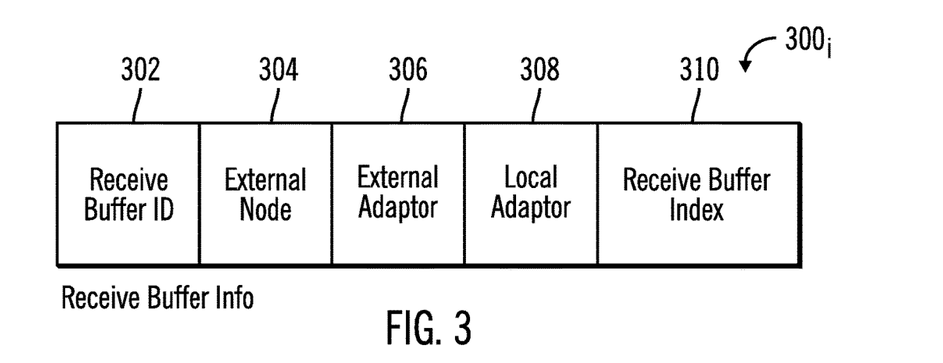
FIG. 3 illustrates an embodiment of receive buffer information maintained for each of the receive buffers in a node.

The adaptors $108_1, 108_2 \ldots 108_A$ further maintain receive buffer information 300 on their respective receive buffers $112_{1,1} \ldots 112_{1,b}, 112_{2,1} \ldots 112_{2,b},$ and $112_{A,1} \ldots 112_{A,b}$ to receive messages from external adaptors on external nodes $100_2 \ldots 100_n$.

The memory 106 may comprise suitable volatile or non-volatile memory devices, such as a solid state storage device (SSD) comprised of solid state electronics, EEPROM (Electrically Erasable Programmable Read-Only Memory), flash memory, flash disk, Random Access Memory (RAM) drive, DRAM, storage-class memory (SCM), Phase Change Memory (PCM), resistive random access memory (RRAM), spin transfer torque memory (STM-RAM), conductive bridging RAM (CBRAM), magnetic hard disk drive, etc.

The network 102 may comprise a Storage Area Network (SAN), a Local Area Network (LAN), a Wide Area Network (WAN), the Internet, and Intranet, etc. Alternatively, the nodes $100_1, 100_2 \ldots 100_n$ may connect over a bus interface, such as a Peripheral Component Interconnect (PCI) bus interface and other interfaces known in the art.

In FIG. 1, the receive buffers $112_{i,j}$ are shown as maintained in a shared memory 106. In an alternative embodiment, each of the adaptors $108_1, 108_2 \ldots 108_A$ may include memory to store their respective receive buffers $112_{1,1} \ldots 112_{1,b}, 112_{2,1} \ldots 112_{2,b},$ and $112_{A,1} \ldots 112_{A,b}$.

In FIG. 1, the message validator 116 is shown as implemented in the adaptors $108_1, 108_2 \ldots 108_A$. In an alternative embodiment, the message validator 116 may be loaded into the memory 106 and executed by one of the processors $104_1$.

The buffer manager 114 may be implemented as program code loaded into the memory 108 and executed by the processors 106. The message validator 116 may also comprise code executed by a processor in the adaptors $108_1, 108_2 \ldots 108_A$. Alternatively, some or all of the functions of the buffer manager 114 and the message validator 116 may be implemented in hardware devices in the node $100_1$ and adaptor $108_i$, respectively.

FIG. 2 illustrates an embodiment of an instance of send buffer information $200_i$ maintained for each of the send buffers 110, and includes a send buffer identifier (ID) 202 identifying the send buffer $110_i$ in the shared memory 106; a receiving node 204 having the receive buffer 206 with which the send buffer 202 is associated; a buffer association indicating some element associated with the send buffer 202, such as a type of work, adaptor, etc. with which the send buffer 202 is associated; and a send buffer index 210 identifying the send buffer index providing entries in the send buffer 202 to use.

FIG. 3 illustrates an embodiment of receive buffer information $300_i$ maintained for each of the receive buffers $112_{i,j}$, and includes a receive buffer identifier 302 identifying the receive buffer $112_{i,j}$; an external node 304 having the external adaptor 304, comprising the sending adaptor, that is associated with and sends messages directly to the receive buffer 302; a local adaptor 308 indicating one of the adaptors $108_1, 108_2 \ldots 108_A$ in the node $100_1$ receiving the messages; and a receive buffer index 310 providing entries in the receive buffer 302 to use to store messages.

Figure 4:
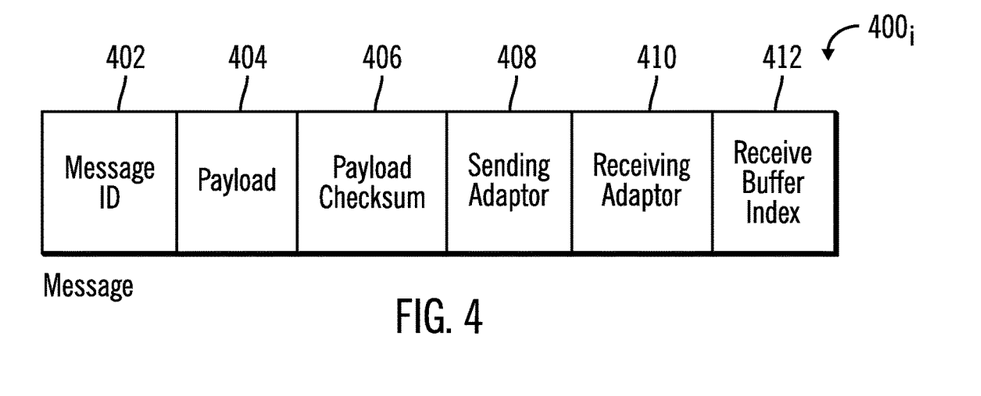
FIG. 4 illustrates an embodiment of a message.

FIG. 4 illustrates an embodiment of a message $400_i$ that is sent by an external sending adaptor $108_j$ and placed in one of the receive buffers $112_{i,j}$, and includes a message identifier (ID) 402; a payload 404; a payload checksum 406 calculated from the payload 404; a sending adaptor 408 in an external node that sent the message; a receiving adaptor 410 to receive the message 402; and a receive buffer index 412 identifying the entry in the receive buffer in which the message 402 is stored. The sending adaptor 408 may write the message directly to the receive buffer $112_{i,j}$ for the sending adaptor $108i$ of b external adaptors in external nodes in the network 102.

Figure 5:
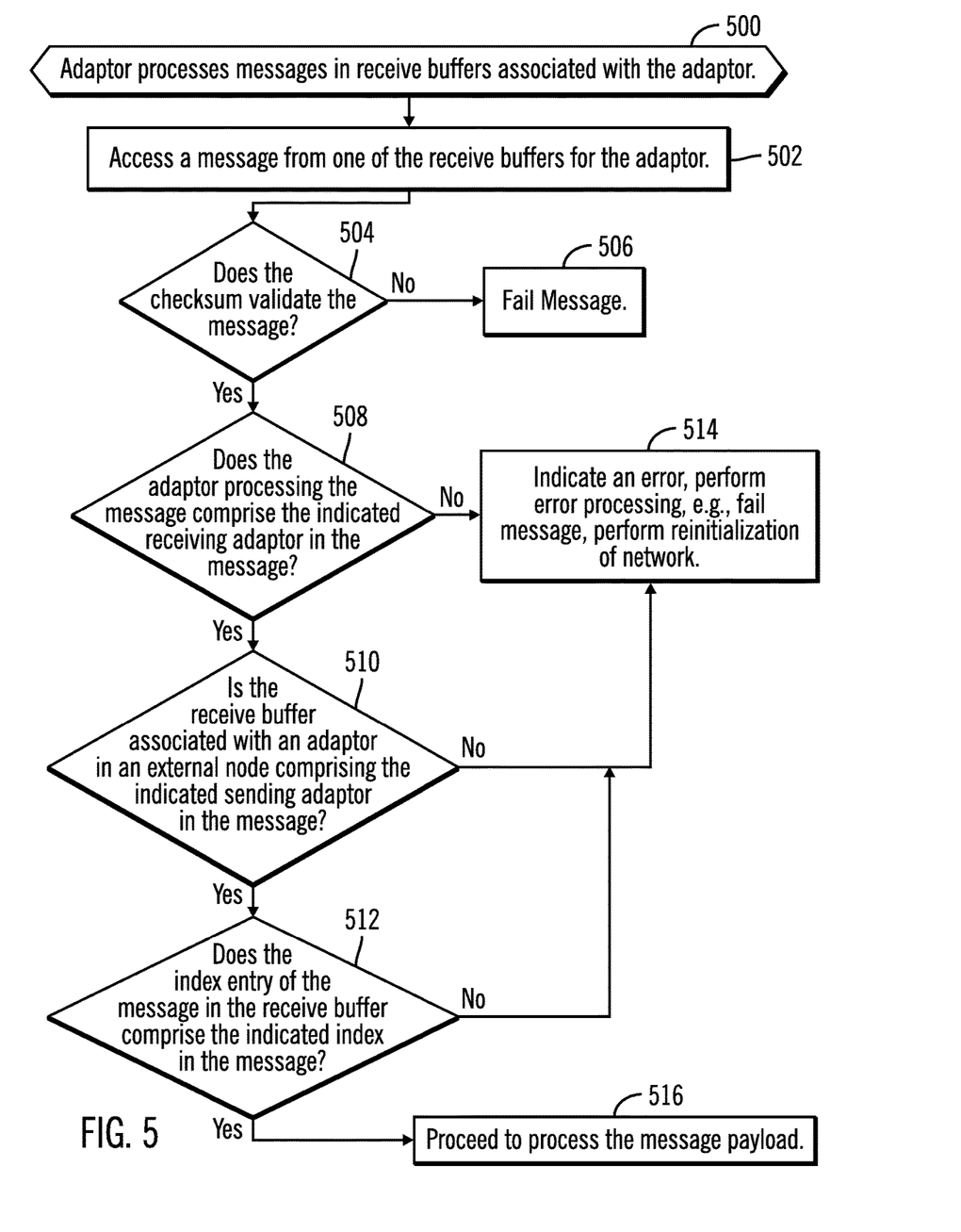
FIG. 5 illustrates an embodiment of operations to process a message in a receive buffer.

FIG. 5 illustrates an embodiment of operations performed by the message validator 116 running in each of the adaptors $108_1, 108_2 \ldots 108_A$ to process messages $400_k$ in the receive buffers $112_{i,j}$ for the adaptor $108_i$ in which the message validator 116 is running. Upon initiating (at block 500) message processing, the message validator 116 accesses (at block 602) a message $400_k$ from one of the receive buffers $112_{i,j}$ for adaptor $108_i$. The message validator 116 may then determine (at block 504) whether the payload 404 is validated by the checksum 406. If not, then the message $400_k$ is failed (at block 506). If (at block 504) the message $400_k$ is validated, then the message validator 116 determines (at block 508) whether the receiving adaptor $108_i$ processing the message $400_k$, the adaptor $108_i$, in which the message validator 116 is executing, matches the indicated receiving adaptor 410 in the message $400_k$. The actual receiving adaptor $108_i$ comprises the adaptor associated with the receive buffer $112_{i,j}$ from which the message was accessed.

If (at block 508) there is a match, i.e., the actual receiving adaptor $108_i$, is the intended receiving adaptor 410, then the message validator 116 determines (at block 510) whether the receive buffer $112_{i,j}$ from which the message was accessed $400_k$ is associated with an external adaptor in the external node that matches the indicated sending adaptor 408 in the message $400_k$, i.e., the external adaptor 406 in the receive buffer information $300_i$ for buffer $112_{i,j}$, matches the indicated sending adaptor 408.

If (at block 510) the sending adaptor is the correct sending adaptor associated with the receive buffer $112_{i,j}$, then the message validator 116 determines (at block 512) whether the index entry in the receive buffer $112_{i,j}$ from which the message $400_k$ was accessed matches the indicated receive buffer index 412 in the message $400_k$. If it is determined that one of the sending and receiving adaptors associated with the receive buffer $112_{i,j}$ and the index entry do not match the corresponding items indicated in fields 408, 410, 412 of the message $400k$, then the message $400_k$ ended up in a wrong receive buffer $112_{i,j}$ and/or index entry, and the message validator 116 indicates (at block 514) an error and performs an error correction operation. If (at block 512) the index entry in the receive buffer $112_{i,j}$ from which the message $400_k$ was accessed matches the indicated receive buffer index 412 in the message $400_k$, then the message validator 116 proceeds (at block 516) to process the payload or forward the message to another component to process. The determinations at blocks 508, 510, and 512 may be performed in orders other than as shown in FIG. 5.

In one embodiment, the error correction operation may comprise performing a network 102 re-initialization which involves reinitializing and resetting all the nodes $100_1$, $100_2 \ldots 100_n$ and their adaptors, which would also remove all the messages stored in the receive buffers in any of the nodes. Re-initialization resets the send buffers and adaptors in the external nodes which may have introduced the error resulting in a message being stored in the wrong receive buffer.

Described embodiments allow the determination of whether a message is in a receive buffer and index entry for which it was intended, and if not error correction operations, such as re-initialization, may be performed to correct the error.

The letter designators, such as b, i, j, k, m, n, A used to designate an element and/or a number of instances of an element may indicate a variable number of instances of that element when used with the same or different elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the processors $104_1$, $104_2$ ... $104_m$ and/or nodes $100_1$, $100_2$ ... $100_n$, may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

Figure 6:
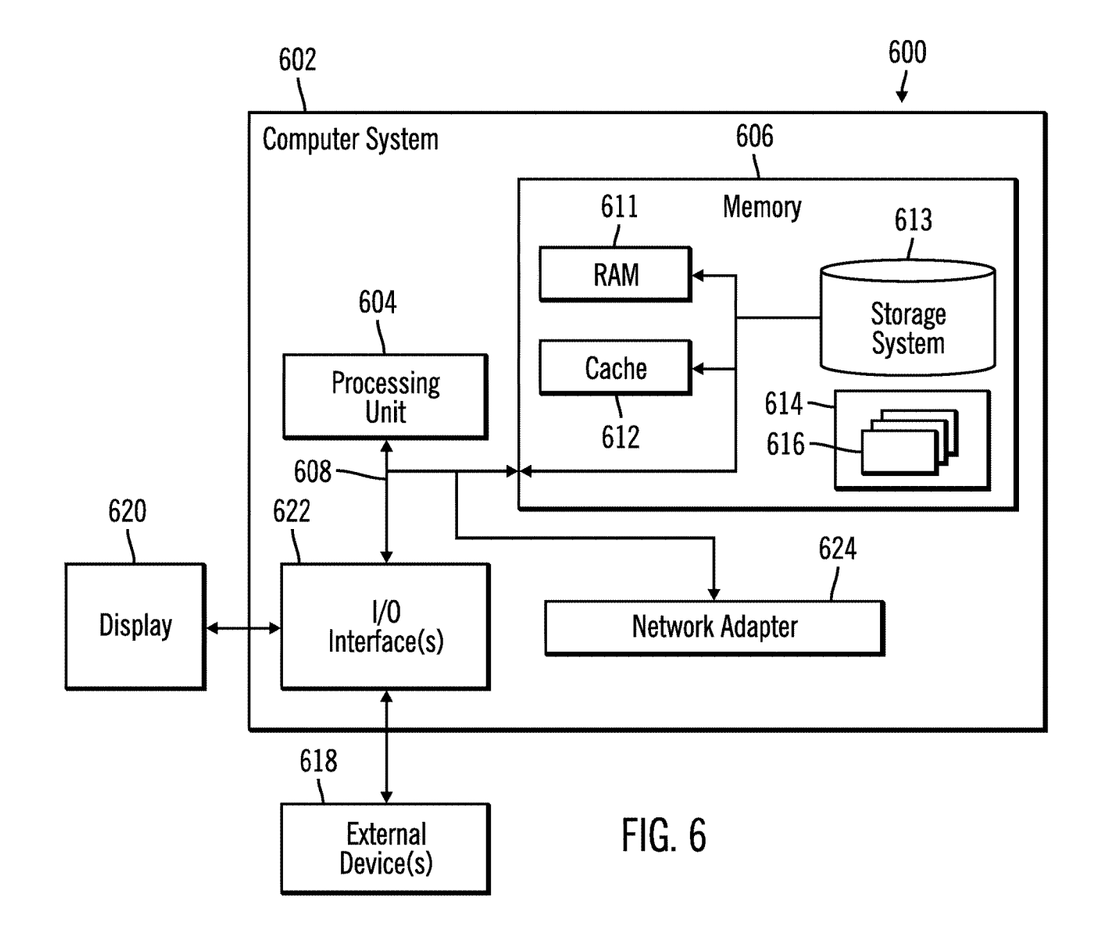
FIG. 6 illustrates a computing environment in which the components of FIG. 1 may be implemented.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing messages transmitted among nodes in a network, the computer program product comprising a computer readable storage medium having computer readable program code embodied therein that when executed in the nodes causes operations to be performed, the operations comprising,
providing at a receiving node receive buffers including a receive buffer for each of a plurality of external adaptors in external nodes, wherein the external nodes comprise nodes the receiving node communicates with over the network;
storing, in the receive buffers, messages from the external adaptors, wherein each of the messages includes an indicated receiving adaptor to receive the message and an indicated sending adaptor comprising one of the external adaptors that sends the message;
maintaining receive buffer information for each receive buffer of the receive buffers indicating an external adaptor to send messages to the receive buffer;
for a message in one of the receive buffers, determining whether the external adaptor indicated in the receive buffer information comprises the indicated sending adaptor in the message and that a receiving adaptor in the receiving node that received the message comprises the indicated receiving adaptor included in the message; and
indicating an error for the message in response to determining that: (1) at least one of the external adaptor in the receive buffer information does not comprise the indicated sending adaptor and (2) that the receiving adaptor in the receiving node that received the message does not comprise the indicated receiving adaptor in the message.

2. The computer program product of claim 1, wherein the operations of determining whether the external adaptor comprises the indicated sending adaptor, whether the receiving adaptor in the receiving node comprises the indicated receiving adaptor, and the indicating the error are performed by one of a plurality of adaptors in the receiving node.

3. The computer program product of claim 2, wherein the determining whether the receiving adaptor comprises the indicated receiving adaptor comprises determining whether the adaptor performing the operations of determining and indicating the error comprises the indicated receiving adaptor.

4. The computer program product of claim 1, wherein the receiving node includes a plurality of adaptors, wherein each of the adaptors in the receiving node is associated with a receive buffer for each of the external adaptors in the external nodes, wherein each of the adaptors process messages in the receive buffers associated with the adaptor, wherein the determining whether the receiving adaptor comprises the indicated receiving adaptor comprises determining whether the adaptor in the receiving node processing and associated with the receive buffer including the message comprises the indicated receiving adaptor in the message.

5. The computer program product of claim 1, wherein the indicating the error further comprises failing the message.

6. The computer program product of claim 1, wherein the indicating the error comprises performing a re-initialization of the nodes in the network and adaptors in the nodes in the network, wherein the re-initialization clears the messages in the receive buffers in the nodes in the network.

7. The computer program product of claim 1, wherein the messages in the receive buffer further includes a payload and a checksum, wherein the operations further comprise:
validating the payload with the checksum, wherein the operations of determining whether the external adaptor in the receive buffer information comprises the indicated sending adaptor and that the receiving adaptor in the receiving node that received the message comprises the indicated receiving adaptor in the message are performed in response to validating the payload with the checksum.

8. A system for receiving messages from external adaptors in external nodes in a network, comprising:
receive buffers including a receive buffer for each of a plurality of external adaptors in the external nodes, wherein the receive buffers store messages from the external adaptors, wherein each of the messages includes an indicated receiving adaptor to receive the message and an indicated sending adaptor that sends the message;
at least one receiving adaptor for receiving messages from the external adaptors in the external nodes; and
a computer readable storage medium including a message validator that when executed perform operations, the operations comprising:
maintaining receive buffer information for each receive buffer of the receive buffers indicating an external adaptor to send messages to the receive buffer;
for a message in one of the receive buffers, determining whether the external adaptor indicated in the receive buffer information comprises the indicated sending adaptor in the message and that a receiving adaptor comprising one of the at least one receiving adaptor that received the message comprises the indicated receiving adaptor included in the message; and
indicating an error for the message in response to determining that: (1) at least one of the external adaptor in the receive buffer information does not comprise the indicated sending adaptor and (2) that the receiving adaptor that received the message does not comprise the indicated receiving adaptor in the message.

9. The system of claim 8, wherein the operations of determining whether the external adaptor comprises the indicated sending adaptor, whether the receiving adaptor comprises the indicated receiving adaptor, and the indicating the error are performed by the at least one receiving adaptor in the system.

10. The system of claim 8, wherein the at least one receiving adaptor comprises a plurality of adaptors, wherein each of the adaptors is associated with a receive buffer for each of the external adaptors in the external nodes, wherein each of the adaptors process messages in the receive buffers associated with the adaptor, wherein the determining whether the receiving adaptor comprises the indicated receiving adaptor comprises determining whether the adaptor associated with the receive buffer including the message comprises the indicated receiving adaptor.

11. The system of claim 8, wherein the indicating the error comprises performing a re-initialization of the nodes in the network and adaptors in the nodes in the network, wherein the re-initialization clears the messages in the receive buffers in the nodes in the network.

12. A method for processing messages in a network, comprising,
providing, by a receiving node, receive buffers including a receive buffer for each of a plurality of external adaptors in external nodes, wherein the receiving node communicates with the external nodes over the network;
storing, in the receive buffers, messages from the external nodes, wherein each of the messages includes an indicated receiving adaptor to receive the message and an indicated sending adaptor comprising one of the external adaptors that sends the message;
maintaining receive buffer information for each receive buffer of the receive buffers indicating an external adaptor to send messages to the receive buffer;
for a message in one of the receive buffers, determining whether the external adaptor indicated in the receive buffer information comprises the indicated sending adaptor in the message and that a receiving adaptor in the receiving node that received the message comprises the indicated receiving adaptor included in the message; and
indicating an error for the message in response to determining that: (1) at least one of the external adaptor in the receive buffer information does not comprise the indicated sending adaptor and (2) that the receiving adaptor in the receiving node that received the message does not comprise the indicated receiving adaptor.

13. The method of claim 12, wherein the determining whether the external adaptor comprises the indicated sending adaptor, whether the receiving adaptor in the receiving node comprises the indicated receiving adaptor, and the indicating the error are performed by one of a plurality of adaptors in the receiving node.

14. The method of claim 12, wherein the receiving node includes a plurality of adaptors, wherein each of the adaptors in the receiving node is associated with a receive buffer for each of the external adaptors in the external nodes, wherein each of the adaptors process messages in the receive buffers associated with the adaptor, wherein the determining whether the receiving adaptor comprises the indicated receiving adaptor comprises determining whether the adaptor in the receiving node processing and associated with the receive buffer including the message comprises the indicated receiving adaptor.

15. The method of claim 12, wherein the indicating the error comprises performing a re-initialization of the nodes in the network and adaptors in the nodes in the network, wherein the re-initialization clears the messages in the receive buffers in the nodes in the network.

\* \* \* \* \*